Oct. 31, 1961   G. R. DEMPSTER ET AL   3,006,490
FORK TRUCKS
Filed Nov. 1, 1955   6 Sheets-Sheet 1
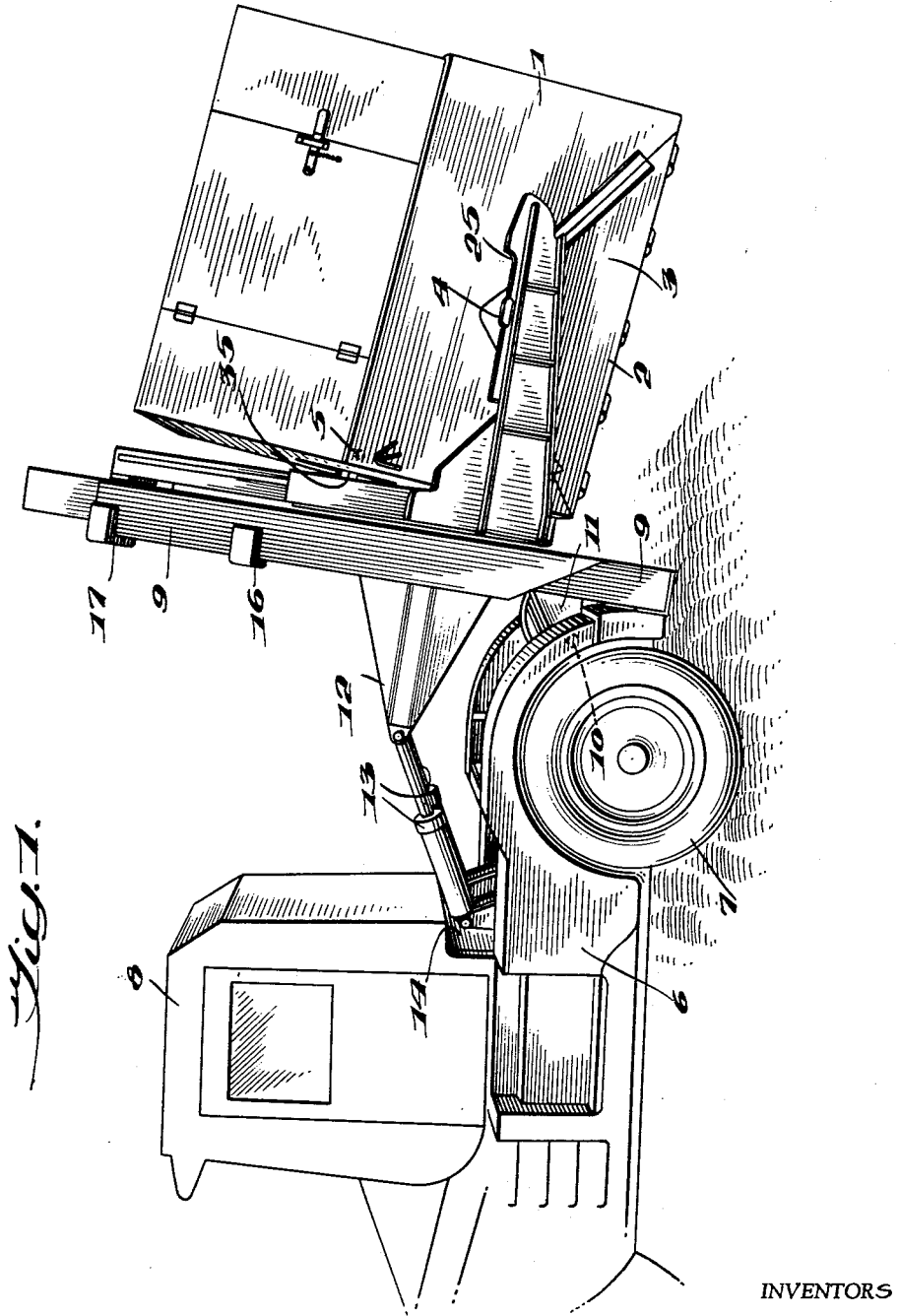
INVENTORS
GEORGE R. DEMPSTER,
HARRY W. JONES,
BY
ATTORNEYS Oct. 31, 1961  G. R. DEMPSTER ET AL  3,006,490
FORK TRUCKS
Filed Nov. 1, 1955  6 Sheets-Sheet 2
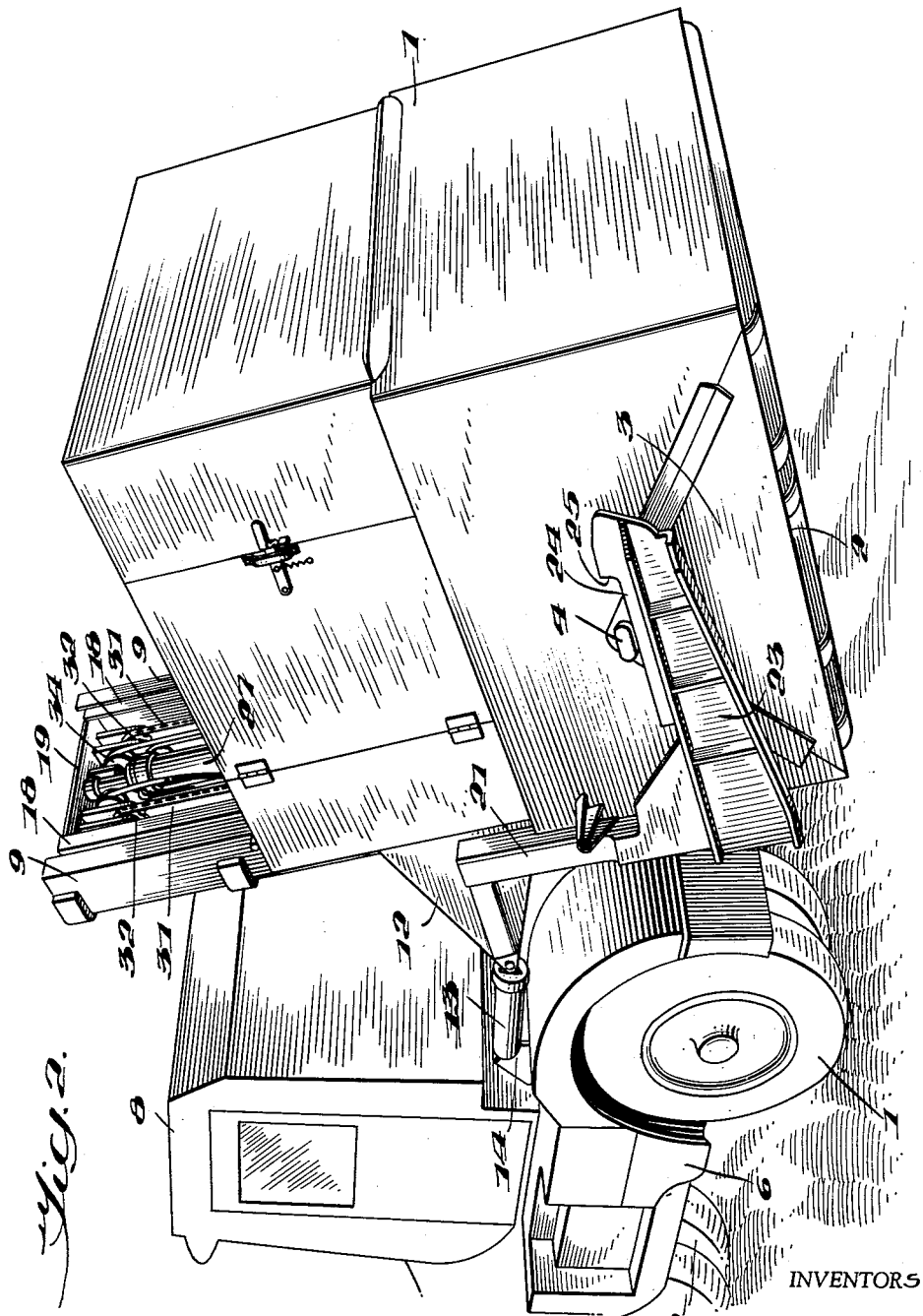
INVENTORS
GEORGE R. DEMPSTER,
HARRY W. JONES,
BY
ATTORNEYS

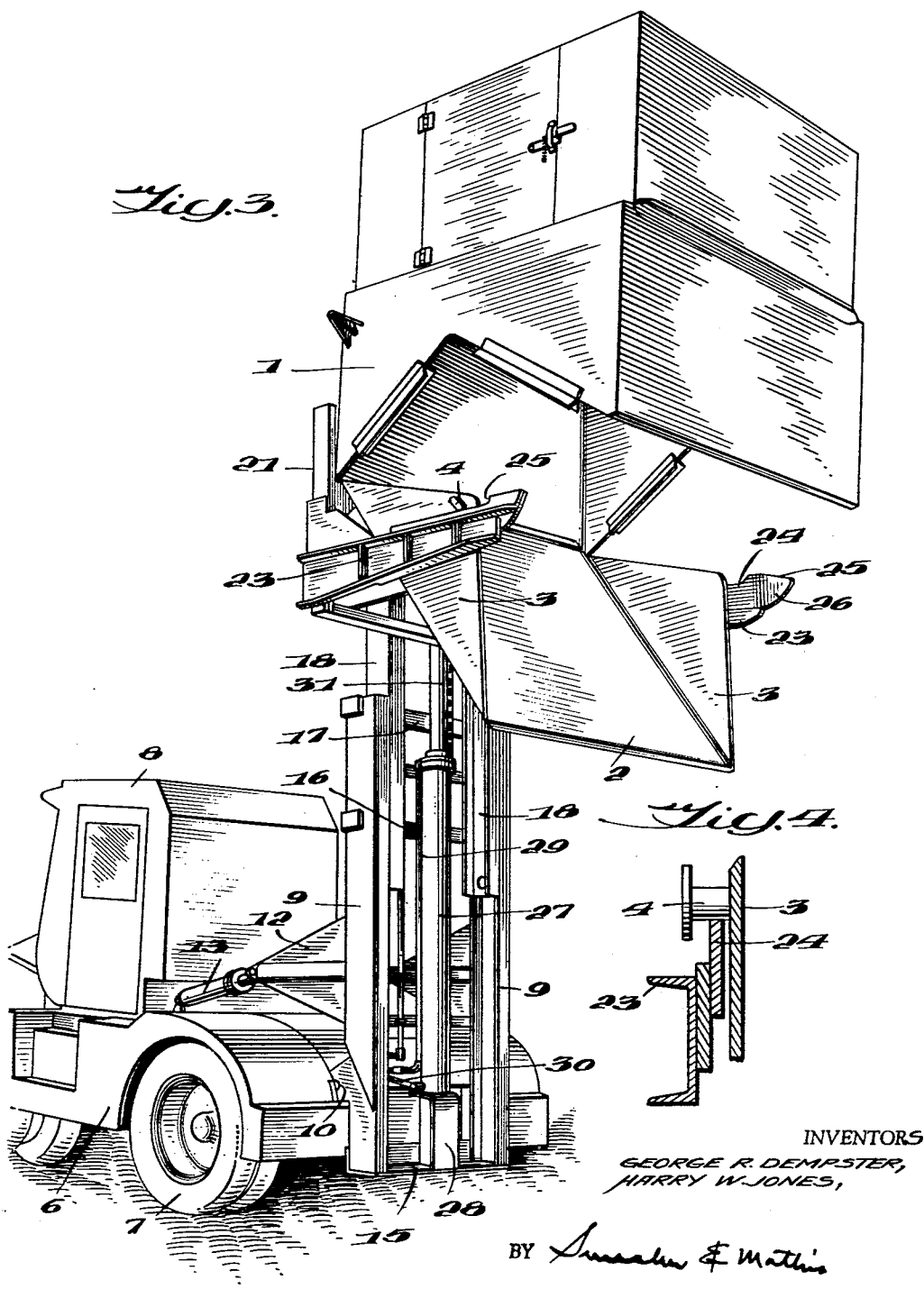

Oct. 31, 1961  G. R. DEMPSTER ET AL  3,006,490
FORK TRUCKS
Filed Nov. 1, 1955  6 Sheets-Sheet 4

INVENTORS
GEORGE R. DEMPSTER,
HARRY W. JONES,
BY
ATTORNEYS

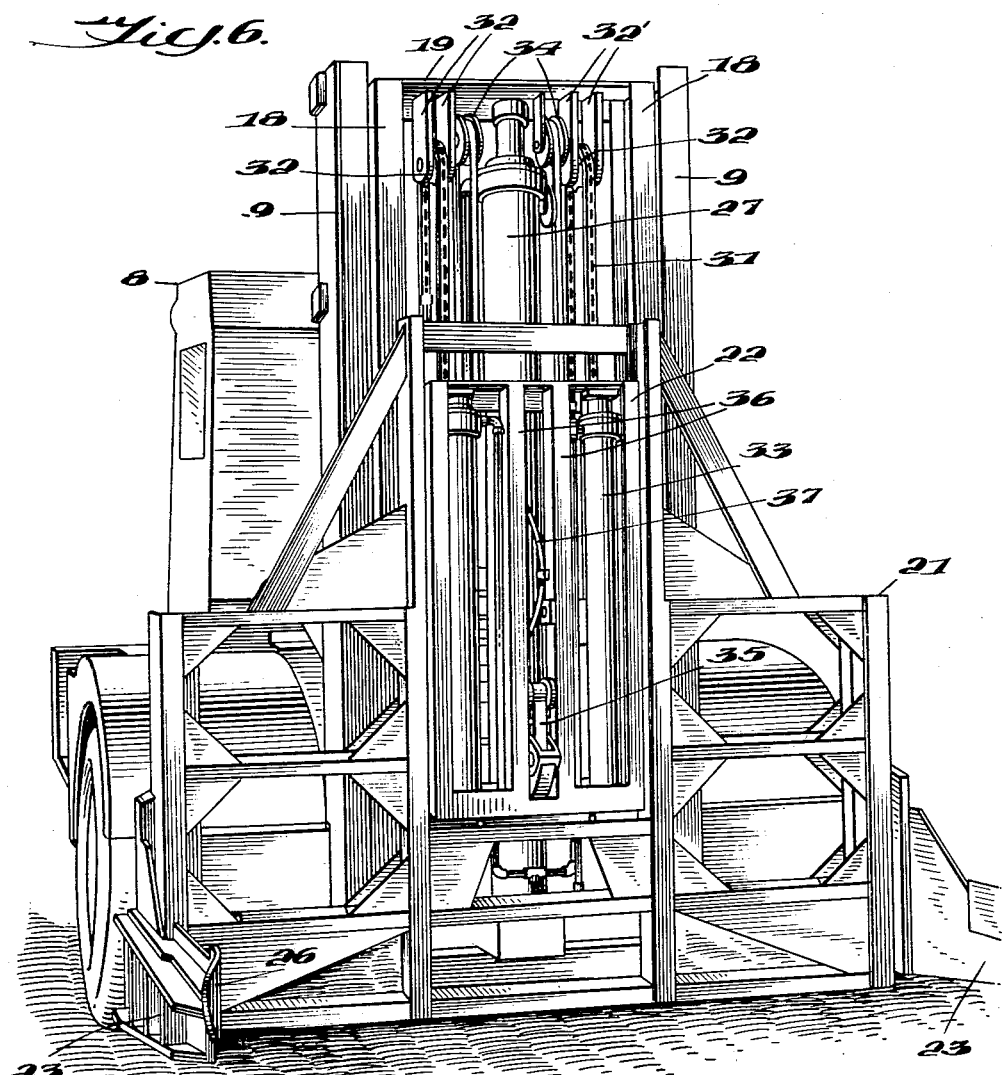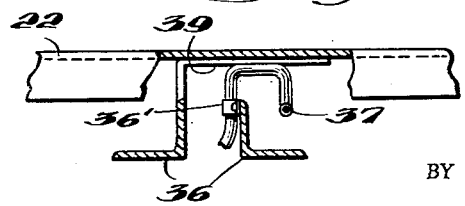

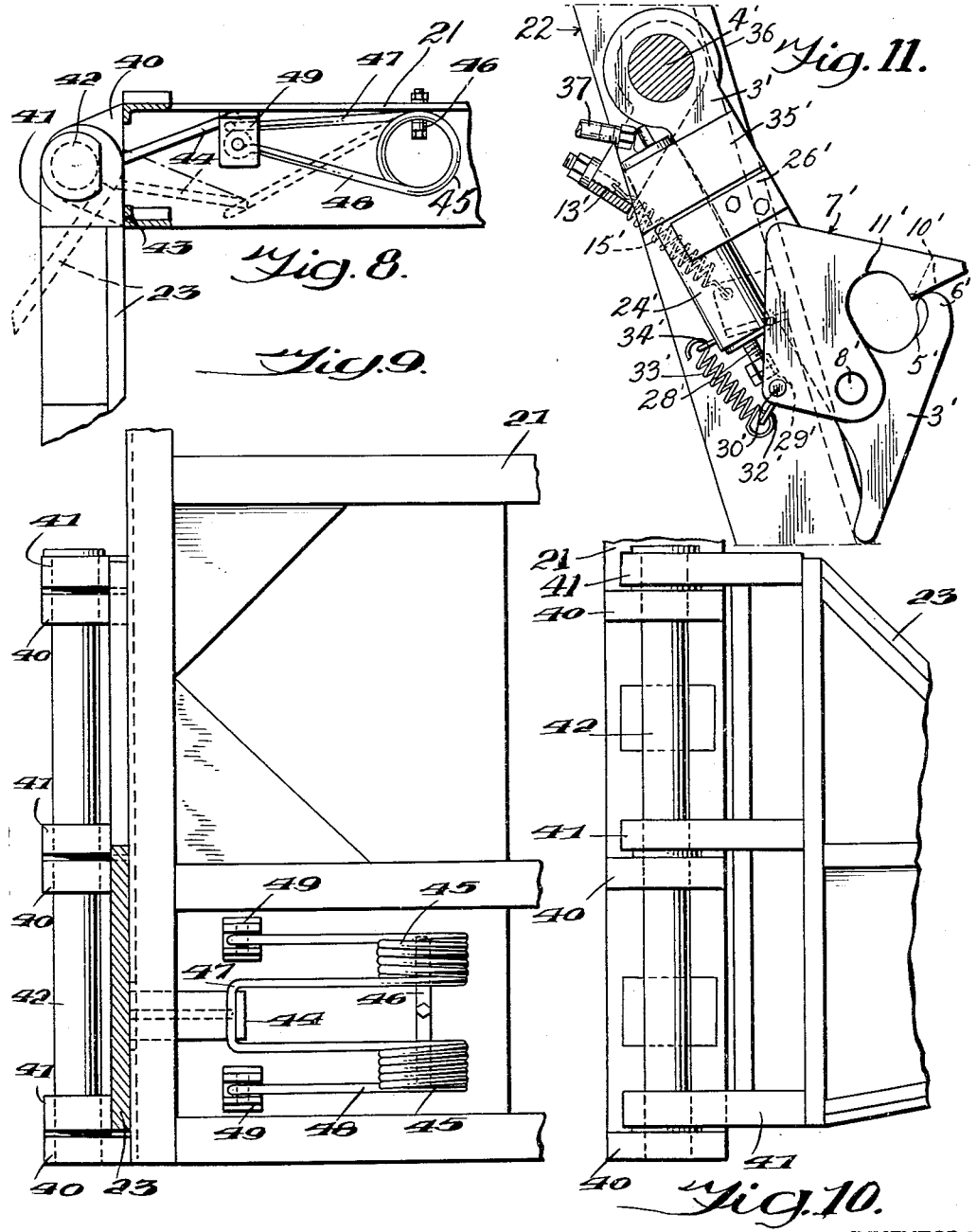

United States Patent Office 3,006,490
Patented Oct. 31, 1961

3,006,490
FORK TRUCKS
George R. Dempster and Harry W. Jones, Knoxville, Tenn., said Harry W. Jones assignor to Dempster Brothers, Inc., Knoxville, Tenn., a corporation of Tennessee
Filed Nov. 1, 1955, Ser. No. 544,177
14 Claims. (Cl. 214—317)

This invention relates to improvements in fork trucks of the character used for picking up, transporting and dumping containers.

Fork trucks of this general type have been used extensively for handling various commodities, usually piled on pallets. Such a truck ordinarily comprises a self-propelled vehicle carrying an upright frame at the forward or rearward end thereof, according to the direction in which the operator is facing. A lifting carriage is slidably mounted in the upright frame and with which the forks are connected. The conventional fork truck does not include any means for holding a container in position thereon for dumping, whereby the use of such fork trucks for the handling of filled containers is materially restricted.

One object of this invention is to overcome the objections heretofore encountered in attempting to handle filled containers by means of a fork truck and to improve the construction of such fork truck to provide for the handling of containers thereby.

Another object of the invention is to provide an elevating mechanism for the use of an automatic hook that will detachably engage the body of a filled container to hold the container against the elevating mechanism during dumping and which automatic hook can be controlled without entangling of the control means in the movable mechanism of the elevating structure.

A further object of the invention is to improve the construction of the fork lift mechanism to provide for the ready engagement thereof with lifting pins on a container and to maintain the arms in proper relation to the container, not only to engage the lifting pins, but to assure of maintenance of engagement therewith during handling of the container.

These objects may be accomplished by providing a transport vehicle with an upright frame on one end thereof, which preferably is capable of swinging movement with respect to the vehicle in a direction forward and rearward thereof. A carriage is slidably mounted on the upright frame and is moved by power in an upright direction with respect thereto. For extreme extension to a high elevation, the carriage preferably is supported by a separate elevator which, in turn, is slidably mounted on the upright frame. The carriage supports the fork arms, which are mounted thereon either rigidly or pivotally, as desired. These arms have provisions for detachable engagement with lifting pins on the body of a container, which means is preferably so shaped and constructed as to assure positive engagement with the lifting pins, even though some flexibility of the arms may result.

Provision may be made also for holding the body of the container in place during dumping of the contents. This is provided preferably by means of an automatic hook which may be mounted on a shuttle, vertically slidable with respect to the carriage and capable of being moved to a high elevation so as to engage the container when lifted to an extreme position for dumping at said high elevation, without the necessity for lowering it to the ground. Provision should be made for operating the automatic hook. Cables are not satisfactory in this relation, and we have discovered that the hook may be operated more effectively by hydraulic or fluid power means, but provision is made to prevent entangling of the hose of such means with the elevating mechanism.

The invention is illustrated in certain embodiments in the accompanying drawings, in which:

FIG. 1 is a side perspective view of a fork truck having this invention applied thereto and shown as handling a dumping container, in the position of picking up the container;

FIG. 2 is a similar view, with the container tipped forward in a transport position;

FIG. 3 is a rear perspective view, with the container in dumping position;

FIG. 4 is a detail cross section through one of the fork arms in relation to a lifting pin on the container;

FIG. 6 is a view similar to FIG. 5, with the mechanism lowered for picking up the container.

FIG. 7 is a detail cross section through a part of the shuttle;

FIG. 8 is a top plan view of a modified form of fork arm mounting, partly in section;

FIG. 9 is a rear elevation thereof;

FIG. 10 is a side elevation thereof; and

FIG. 11 is a detailed view of the automatic hook used in accordance with this invention.

Figure 5:
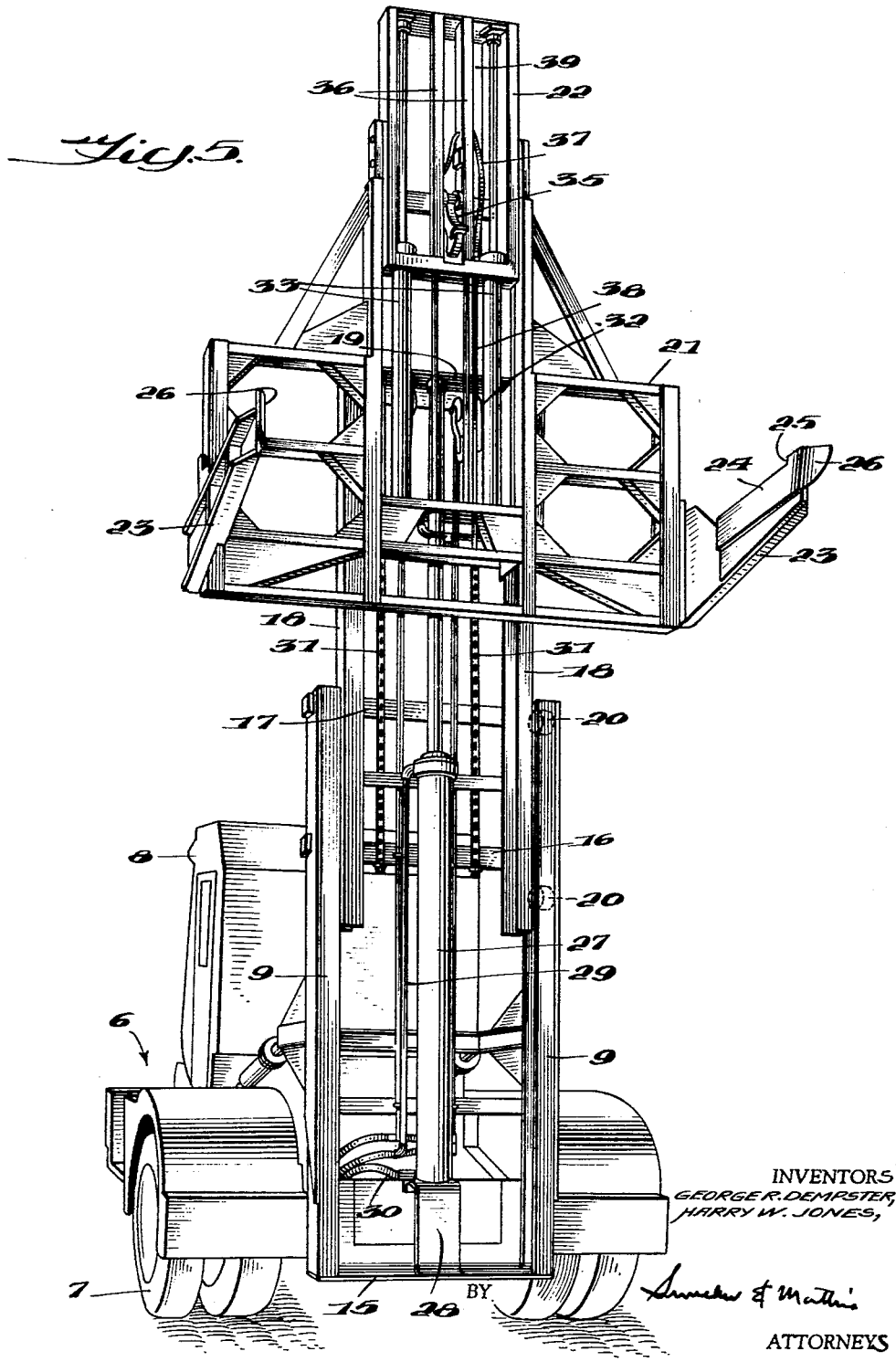
FIG. 5 is a view similar to FIG. 3, but with the container removed for clearness of illustration.

The invention is shown as applied to a fork truck for handling and dumping containers such, for example, as were illustrated in United States Patents of George R. Dempster, No. 2,179,779, November 14, 1939, and No. 2,199,520, May 7, 1940. Such containers usually are provided with a drop bottom door for dumping the contents thereof.

Referring to FIGS. 1, 2 and 3, the body of the container is generally indicated at 1 and may have a closed or open top, as desired, and of any suitable shape, one embodiment of which is illustrated merely for purpose of example and may be varied to any extent desirable. A drop bottom door is illustrated generally at 2, hinged at the forward edge thereof to the body 1 of the container and provided with upturned end plates thereon, indicated at 3. Each of the plates is shown as substantially triangular in shape to fit similarly shaped cut-outs in the end walls of the body 1 of the container. Lifting pins 4 are provided on these end plates and extend outwardly therefrom for detachable engagement, to hold the bottom closed during transportation. The front wall of the body 1 of the container is provided with a bail bar, generally indicated at 5 in FIG. 1, for detachable engagement by a hook to hold the body of the container on the elevating mechanism during lowering of the carriage for opening the drop bottom door for dumping.

The truck comprises a suitable transport vehicle, preferably self-propelled, including a chassis, generally indicated at 6, mounted on supporting and steerable wheels 7 at the respective ends thereof, either of which sets of wheels may be power operated by the motor provided on the chassis. The chassis illustrated also includes a cab 8 for enclosing operating parts of the vehicle and within which the operator may face either toward the elevating mechanism or in the opposite direction, as desired.

Mounted on one end of the chassis 6, on the frame thereof, is a pair of upright guides 9 which preferably are pivotally supported on a transverse axis, illustrated at 10 in FIG. 1, by pivot pins connecting plates 11 attached to the members 9 with the frame of the chassis. Such mounting permits the elevating mechanism to swing forward and backward with respect to the chassis. Tie plates are shown at 12 anchored at one end to the upright guides 9 and connected at the opposite end thereof with suitable power means, such as hydraulic power devices 13, that extend from the tie plates 12 to an anchoring plate 14 on the chassis frame. Thus, the elevating mechanism will be caused to swing forward and backward with respect to the chassis frame upon operation of the hydraulic power devices 13.

The upright guides 9 are suitably braced at desired points along the height thereof, as by means of a cross plate 15, at the lower ends of these guides and by plates 16 and 17 adjacent the upper ends thereof.

The upright guides 9 are provided with guide channels on the inner faces thereof, as shown more clearly in FIGS. 5 and 6. Mounted between the guides 9 and slidably mounted with respect thereto is an elevator comprising a unitary frame including spaced upright 18, suitably braced intermediate the ends thereof and connected together at their upper ends by a top plate 19. The elevator uprights 18 are capable of longitudinal movement with respect to the guides 9 in guiding relation therewith, as by wheels or rollers 20 (FIG. 5) that are guided in the channels provided at the inner faces of the guides 9.

Mounted on the front face of the uprights 18 is a carriage frame, generally indicated at 21. The frame 21 has an interengaged relation with the uprights 18 carrying rollers interfitting with guideways at the inner faces of the uprights 18, preferably in the manner generally indicated in our prior application Serial No. 446,012, filed July 27, 1954, now Patent No. 2,751,100.

The carriage frame 21 also in turn forms a guideway for a shuttle frame 22 that is slidably mounted therein for raising and lowering movements with respect to the carriage 21 and the elevator. The shuttle 22 may also be mounted on suitable rollers in guideways provided in the carriage frame, substantially as indicated in our aforesaid application Serial No. 446,012. The details of these mountings need not be illustrated herein since they are adequately shown in said earlier application.

The carriage frame 21 extends laterally throughout the major portion of the width of the chassis, as will be apparent from the drawings, and is suitably braced for effective handling of containers. At the opposite ends of the frame 21, fork arms are provided, as illustrated at 23, extending outwardly from the frame 21 and being spaced apart a distance slightly greater than the length of the container body 1. These fork arms 23 embrace the container, as shown in FIGS. 1 and 2, beneath the lifting pins 4. It is impractical to obtain a precise spacing of the lifting arms and yet it is desirable that these engage the lifting pins between the heads of the latter and the plates 3 on the drop bottom door.

We have provided an engaging plate 24 on each of the fork arms, which plate extends above the fork arm itself, as shown in FIGS. 2 and 4, with a relatively narrow surface with respect to the length of the lifting pin 4, to assure of engagement with the lifting pin between the head thereof and the door plate 3. The plate 24 has a relatively straight upper edge extending to a shoulder 25 adjacent the outer end of the plate, of sufficient height to prevent accidental slipping off of the lifting pin 4 when the container is substantially in the position shown in FIG. 1 and is disconnected from the hoisting mechanism. The outer end of the plate 24 is also deflected laterally, as indicated at 26 in FIGS. 3 and 5, to facilitate the guiding of the arms into embracing relation with the opposite ends of the container.

The elevating mechanism preferably includes hydraulic power devices for accomplishing the lifting actions. One power device is shown at 27 in FIGS. 3 and 5, the lower end of the cylinder of which is seated upon a bracket 28 carried by the tie plate 15 at the lower ends of the guides 9. The piston rod extending from the cylinder of the power device 27 is connected with the top plate 19 of the elevator. This may be a single-acting cylinder or double-acting, as desired, but connections are shown at both the top and bottom ends of the cylinder for supplying hydraulic fluid alternately thereto, as indicated at 29 and 30, from a suitable power source on the vehicle. It will be apparent that, upon supplying of hydraulic fluid under pressure to the lower end of the cylinder of the power device 27, the piston rod thereof will be moved upward, thereby forcing upward the elevator, including the uprights 18.

Elevating chains are shown at 31, each of which is anchored at one end to the cross member 16 that extends between the guides 9 and from which the chains 31 extend over guide rollers or sprockets 32 (FIGS. 2, 5 and 6), thence downward to the carriage frame 21. The sprockets 32 are suspended by brackets 32a from the head plate 19 (FIG. 6).

It will be apparent that on raising movement of the elevator, including the uprights 18, with respect to the guides 9, by the manipulation of the hydraulic power device 27, this raising movement will thereby move upward the guide rollers or sprockets 32 intermediate the length of the chains 31, and these will force an upward travel of the carriage 21 with respect to the elevator and at twice the speed of travel of the latter.

Mounted on the carriage 21 are hydraulic power devices 33, the cylinders of which are fixed to the frame 21, while the pistons extend upward and are secured to the upper end of the shuttle 22. At any desired time, with respect to the movement of the carriage or when the latter is stationary, the hydraulic power devices 33 may be operated to raise the shuttle 22 with respect to the carriage.

The fluid power may be supplied to the hydraulic power devices through pipes or flexible hoses which may be guided through the elevating mechanism by means of suitable rollers, some of which are illustrated at 34 in FIG. 6.

The shuttle 22 carries an automatic hook, generally indicated at 35, adapted for selective engagement with the bail bar 5 on the container body 1. This automatic hook 35 preferably is power operated by a hydraulic cylinder connected therewith, and the construction and operation of the automatic hook are as set forth in detail in the copending application of Lafayette Bogle Standifer, Jr. and Fred S. Simpson, Serial No. 520,230, filed July 6, 1955, now Patent No. 2,872,237, granted February 3, 1959.

As shown in FIG. 11, the automatic hook comprises a body 3' in the form of an elongated member or casting pivotally supported by a pin 4' which extends transversely of the shuttle 22 and is secured between angle bars 36 which are spaced apart just sufficient to accommodate the automatic hook therebetween. The lower end portion of the body 3' has a laterally projecting hook formed with a throat or seat 5' adapted to receive the bail bar 5 therein, and an extended tip 6' on the opposite side of the throat 5' from the body 3' tending to retain the bail seated in the throat.

A closure is indicated generally at 7' pivotally mounted at 8' on the body 3' of the hook. The closure 7' is formed of a pair of side plates connected together along their back edges at 10' and extending forwardly in embracing relation with the body 3' on opposite sides of the latter in overlapping relation with the tip 6' of the hook, projecting outwardly from the latter. These side plates are connected together by a spacer block 10' at the rearward ends thereof in position to seat upon the tip 6'. The closure 7' is also provided with a notch 11' in the under edges of the plates beside the spacer block 10' and in coacting relation with the throat 5' in the hook. The throat 5' and notches 11' are sufficiently enlarged to receive freely therein the bail 5 of the container.

Suspended from the pivot pin 4' is a U-shaped hook bracket 13', the opposite ends of which are supported by the pin 4', while the intermediate portion thereof extends downward over the bars 36. The cross bar at the lower end of the bracket 13' is connected at its opposite ends with coiled springs 15'. Each of the coiled springs 15' is anchored at one end to a tab secured to the adjacent bar 36, while the opposite end of the coiled spring 15' is connected with a bolt on the bracket 13'.

A power operated means for the closure 7' comprises the hydraulic cylinder 24' which is mounted on the hook body 3' by mounting bars 26'. The bars 26' are welded or otherwise secured rigidly to the body 3' to effect a secure mounting of the cylinder in place thereon.

At its lower end the piston in the cylinder is connected through a piston rod 28' with a bracket 29' in the form of a yoke bearing upon a bar 30' that extends between the sides of closure 7'.

Secured to the bar 30' is a tab 32' with which a coiled spring 33' is connected at one end, while the opposite end of said coiled spring 33' is connected with a tab 34' on the cylinder 24'. This connection of the spring 33' is such as to maintain normally the closure 7' in its closed position over throat 5'.

A pair of spacer bars 35' that are mounted on opposite sides of the body 3' of the hook extend laterally therefrom in position to engage the hook bracket 13' to swing the hook forward under the influence of the coiled springs 15'.

Whenever hydraulic pressure is supplied through the hose 37 to the cylinder 24', the piston therein is forced downward, thus forcing the connecting rod 28' in a downward direction and acting through the bracket 29' and bar 30' to swing the closure 7' about its pivotal support 8' away from the throat 5', thus releasing the bail from the latter and permitting disconnection of the container. The hydraulic cylinder connected with the automatic hook is supplied with fluid through a flexible hose 37 that extends downward to a pipe 38 suitably mounted in the elevator on the carriage frame 21. The hose 37 extends around the web of one of the angle bars 36, to which it is secured intermediate its ends by a clamp 36', as illustrated in FIG. 7. The hose extends lengthwise of that bar on both sides thereof, between the bars and along the outer side of one of them.

Provision is made for maintaining the hose in proper nested relation within the shuttle 22. We have provided this by means of a plate shown at 39, which extends across between the angle bars 36 and to one side of one of them, as illustrated in FIGS. 5 and 7, along the open face of the shuttle sufficiently to confine the hose 37 within the shuttle, against possibility of its becoming entangled with other parts of the elevating mechanism. Thus, upon raising movement of the shuttle with respect to the carriage 21, the hose 37 is free to move upward, but will be confined within the lateral confines of the front and back faces of the shuttle, in part by passing around the back of the angle 36 and between the latter and the plate 39.

Each of the fork arms 23 is shown as secured to opposite ends of the carriage frame 21. These arms may be fixed rigidly with respect to the frame, if desired, or may be mounted thereon for lateral swinging movement. An example of the latter is illustrated in FIGS. 8 to 10.

The carriage frame 21 is provided with lugs 40 along each opposite end thereof, spaced at intervals as desired. The arm 23 is provided with ears 41 thereon in positions to overlie the lugs 40. A hinge pin 42 extends through the lugs 40 and ears 41, pivotally connecting these parts together, as will be apparent from the drawings.

Normally, the fork arm 23 is confined by a face 43 to a position at right angles to the carriage frame 21, but this arm is free to swing outward, as illustrated in dotted lines in FIG. 8, as for instance when the extreme end 26 of the arm strikes an abutment or an edge of the container, and in order to clear the latter. It is desirable that means be provided for returning the arm 23 to its initial position, as shown in full lines in FIG. 8.

We have provided a finger 44 on the inner face of each arm 23 and extending inwardly relative to the carriage frame 21, normally in the full line position shown in FIG. 8. This finger 44 is engaged by a torsion spring when the arm 23 is moved laterally, as to the dotted line position in FIG. 8, acting to restore the arm 23 to its initial full line position. Such a torsion spring and finger are provided on each arm 23 when the latter is pivoted to assure of proper action thereof. The preferred form of torsion spring for this purpose is illustrated in FIGS. 8 to 10.

This spring is preferably formed of one strip of metal provided with coils 45 anchored to a side of the carriage frame 21 by a bar 46. Intermediate the coils 45 is a loop portion 47 which embraces the free end of the finger 44. The free ends of the spring, indicated at 48, are anchored to mounting brackets 49 secured on the carriage frame 21.

As shown in FIG. 8, the finger 44 lies behind the loop portion 47 of the torsion spring when the arm 23 is in its normal full line position. Upon outward swinging of the arm by engagement with the container or otherwise, the finger 44 will swing outward away from the adjacent face of the frame 21, as to the dotted line position shown in FIG. 8, against the tension of the torsion spring. Then when the pressure on the free end of the fork arm 23 is removed, the torsion spring will act through the finger 44 to restore the fork arm 23 to its normal position. If desired, more than one such torsion spring may be provided on each fork arm, although if sufficiently heavy, one will be strong enough for the purpose.

The construction illustrated and described makes it possible for a fork truck to handle securely and readily a drop bottom container, without danger that the container will become disconnected from the fork truck accidentally. The arms 23 may be inserted beneath the lifting pins 4, with the elevating mechanism in the position shown in FIG. 1, and then merely by swinging the elevating mechanism forward on the pivot pins 10 to the position shown in FIG. 2, the container will be lifted off the ground sufficiently for transportation. In many instances, it will not be necessary to raise the hoisting mechanism to an elevating position, at least until it is desired to dump the container.

It is also possible with this mechanism, as will be apparent from FIGS. 3 and 5, to raise the container to an abnormally high elevation for dumping and, when the drop bottom door is opened to a sufficient angle for discharge of the container, it is still far above the level of the ground and can dump into high trucks, cars, etc., as is often desired. In such high elevation and for dumping it at that point, the container is securely held on the hoisting mechanism by the provision of the automatic hook 35, which may be opened, when required, by hydraulic means, without danger of entanglement of the conduits therefor with the hoisting mechanism.

The carriage frame 21 is sufficiently wide to accommodate and receive containers of the character described and to assure of proper embracing relation of the lifting arms with the containers. The provision of the plates 24 on the lifting arms allows for some deflection of these arms due to wear and flexibility, and yet assures that the arms will engage the lifting pins between the heads of the latter and the door plates, without danger of the container falling off the lifting arms or becoming disengaged therefrom.

While the invention has been illustrated and described in certain embodiments, it is recognized that other variations and changes may be made therein without departing from the invention, as set forth in the claims.

We claim:
1. In transporting and dumping equipment, the combination with a container adapted for discharging the contents therefrom, of a base structure adapted to be mounted on a motor vehicle, an upright frame connected with the base structure, an elevator structure movably mounted on the upright frame, means connected with the elevator structure for lifting the container, an automatic hook constructed for secure engagement with the container body portion, means for closing over the hook after engagement thereof with the container body portion, power means for opening the hook closing means from closed relation to the hook and a flexible device extending to the hook power means through the elevator structure.

2. In transporting and dumping equipment, the combination with a container including a body portion and a dumping door connected therewith adapted to be opened for discharging the contents therefrom, of a base structure adapted to be mounted on a motor vehicle, an upright frame pivotally connected with the base structure for swinging movement forward and rearward with respect thereto, an elevator structure movably mounted on the upright frame, means connected with the elevator structure for lifting the container, an automatic hook constructed for secure engagement with the container body portion and for holding said body portion on the elevator structure, means for closing over the hook after engagement thereof with the container body portion, fluid power means for opening the hook closing means from closed relation to the hook, and a flexible hose extending to the fluid power means through the elevator structure.

3. In transporting and dumping equipment, the combination with a container including a body portion and a dumping door connected therewith adapted to be opened for discharging the contents therefrom, of a base structure adapted to be mounted on a motor vehicle, an upright frame pivotally connected with the base structure for swinging movement forward and rearward with respect thereto, an elevator structure movably mounted on the upright frame, means connected with the elevator structure for lifting the container, an automatic hook constructed for secure engagement with the container body portion and for holding said body portion on the elevator structure, means for closing over the hook after engagement thereof with the container body portion, fluid power means for opening the hook closing means from closed relation to the hook, a flexible hose extending to the fluid power means through the elevator structure, and means for confining the hose within the elevator structure during raising and lowering movements thereof.

4. In transporting and dumping equipment, the combination with a container including a body portion and a dumping door connected therewith adapted to be opened for discharging the contents therefrom, of a base structure adapted to be mounted on a motor vehicle, an upright frame pivotally connected with the base structure for swinging movement forward and rearward with respect thereto, an elevator structure movably mounted on the upright frame, means connected with the elevator structure for lifting the container, an automatic hook constructed for secure engagement with the container body portion and for holding said body portion on the elevator structure, means for closing over the hook after engagement thereof with the container body portion, fluid power means for opening the hook closing means from closed relation to the hook, a flexible hose extending to the fluid power means through the elevator structure, an upright member connected with the elevator structure, and a plate connected with the elevator structure in spaced relation with said upright member, with the hose extending therebetween and confined thereby within the elevator structure during raising and lowering movements of the latter.

5. In transporting and dumping equipment, the combination with a container including a body portion and a dumping door connected therewith adapted to be opened for discharging the contents therefrom, of a base structure adapted to be mounted on a motor vehicle, an upright frame connected with the base structure, elevator guide members slidably mounted on the upright frame for raising and lowering movements with respect thereto, a lifting frame connected with the elevator guide members for raising and lowering movement with respect thereto, means for causing raising and lowering movements of the lifting frame and elevator guide members respectively, a shuttle slidably mounted upon the lifting frame, a hook mounted on the shuttle and including means for engaging the container body portion for holding said container body portion during opening of the door to discharge the contents therefrom, means for closing over the hook after engagement thereof with the container body portion, power means connected with the hook closing means and mounted within the shuttle for causing opening movements of the hook closing means, and cable guide means extending through the shuttle to the power means for operating the latter.

6. In transporting and dumping equipment, the combination with a container including a body portion and a dumping door connected therewith adapted to be opened for discharging the contents therefrom, of a base structure adapted to be mounted on a motor vehicle, an upright frame connected with the base structure, elevator guide members slidably mounted on the upright frame for raising and lowering movements with respect thereto, a lifting frame connected with the elevator guide members for raising and lowering movement with respect thereto, means for causing raising and lowering movements of the lifting frame and elevator guide members respectively, a shuttle slidably mounted upon the lifting frame, a hook mounted on the shuttle and including means for engaging the container body portion for holding said container body portion during opening of the door to discharge the contents therefrom, power means connected with the automatic hook and mounted within the shuttle for causing opening movements of the automatic hook, cable guide means extending through the shuttle to the power means for operating the latter, and means connected with the shuttle at the forward and backward edge portions thereof and having said cable guide means extending therebetween for confining said cable means to the interior of the shuttle during raising and lowering movements thereof.

7. In a fork truck, the combination of a carriage frame, a pair of fork arms adjacent opposite sides of said frame, means pivotally connecting said arms on upright axes with the frame, each of the arms having a finger connected therewith and extending inwardly therefrom, and a torsion spring in position to engage the finger upon outward movement of the adjacent arm normally tending to restore the arm to its initial position, each torsion spring including a pair of coils having a loop portion therebetween extending in embracing relation with the finger and acting thereon to swing said arm.

8. In transporting and dumping equipment, the combination with a container having supporting means therefor and separate holding means on the container operable in the dumping thereof, of an upright frame adapted to be mounted on a motor vehicle, a carriage mounted on the upright frame for raising and lowering movements with respect thereto, a carriage frame, means mounting the carriage frame on the carriage for raising and lowering movements relative thereto, means connected with the carriage frame and with the container supporting means for raising and lowering the container, a shuttle mounted on the carriage frame for raising and lowering movements relative thereto, a hook on the shuttle for engaging the holding means on the container operable in the dumping action thereof, means for closing over the hook for confining the holding means during said dumping action and power action, and power means for opening said closing means.

9. In transporting and dumping equipment, the combination with a container having supporting means therefor and separate holding means on the container operable in the dumping thereof, of an upright frame adapted to be mounted on a motor vehicle, a carriage mounted on the upright frame, means for raising and lowering the carriage with respect to the upright frame, a carriage frame, means mounting the carriage frame on the carriage for raising and lowering movements relative thereto, means connected with the carriage frame and spaced apart a distance greater than the length of the container therebetween and engaging the container supporting means for supporting the container and for raising and lowering the container, a shuttle mounted on the carriage frame, means connected with the shuttle for raising and lowering the shuttle relative to the carriage frame, a hook device on the shuttle for engaging the holding means on the container operable in the dumping action thereof upon lowering movement of the carriage frame relative to the shuttle, and means for closing over the hook and for confining the holding means therein during said dumping action.

10. In transporting and dumping equipment, the combination with a container having supporting means on opposite ends thereof and separate holding means on the container operable in the dumping thereof, of an upright frame adapted to be mounted on a motor vehicle, a carriage mounted on the upright frame, means connected with the carriage for raising and lowering the carriage relative to the upright frame, a carriage frame mounted on the carriage, means for raising and lowering the carriage frame relative to the carriage, fork arms connected with the carriage frame embracing the container and spaced apart a greater distance than the length of the container therebetween and engaging the container supporting means for supporting the container thereby, a shuttle mounted on the carriage frame, means connected with the shuttle for raising and lowering the shuttle relative to the carriage frame, and a hook device on the shuttle in position for engaging the holding means on the container operable in the dumping action thereof.

11. In a motor vehicle, the combination with a container including a body portion and a drop bottom door connected with the body portion and adapted to be opened for discharging the contents therefrom, said drop bottom door having lifting pins connected therewith at opposite ends of the container for supporting the container, and separate bail means on the container for supporting the body portion during dumping of the contents therefrom, of an upright frame on the motor vehicle, a carriage mounted on the upright frame, means connected with the carriage for causing raising and lowering movement thereof with respect to the upright frame, a carriage frame mounted on the carriage, means connected with the carriage frame for causing raising and lowering movements thereof relative to the carriage, fork arms mounted on the carriage frame and spaced apart a greater distance than the length of the container therebetween engaging the lifting pins of the container for supporting the container, a shuttle mounted on the carriage frame, means for raising and lowering the shuttle relative to the carriage frame, and a hook device on the shuttle in position for engaging the bail means on the body portion of the container to support the body portion of the container thereby upon lowering movements of the fork arms relative thereto for discharging the contents from the container.

12. In transporting and dumping equipment, the combination with a container having supporting means on opposite ends thereof and separate holding means on the container operable in the dumping thereof, of an upright frame adapted to be mounted on a motor vehicle, a carriage mounted on the upright frame, means connected with the carriage for raising and lowering the carriage relative to the upright frame, fork arms connected with the carriage embracing the container and spaced apart a greater distance than the length of the container therebetween and engaging the container supporting means for supporting the container thereby, a shuttle mounted on the carriage, means connected with the shuttle for raising and lowering the shuttle relative to the carriage, and a hook device on the shuttle in position for engaging the holding means on the container operable in the dumping action thereof.

13. In transporting and dumping equipment, the combination with a container having supporting means on opposite ends thereof and separate holding means on the container operable in the dumping thereof, of an upright frame adapted to be mounted on a motor vehicle, a carriage mounted on the upright frame, means connected with the carriage for raising and lowering the carriage relative to the upright frame, fork arms connected with the carriage embracing the container and spaced apart a greater distance than the length of the container therebetween and engaging the container supporting means for supporting the container thereby, a shuttle mounted on the carriage, means connected with the shuttle for raising and lowering the shuttle relative to the carriage, a hook device on the shuttle in position for engaging the holding means on the container operable in the dumping action thereof, and means for closing the hook device in engagement with the holding means and locking the hook device closed during the raising and lowering movements of the arms, and power means for opening said hook closing means.

14. In transporting and dumping equipment, the combination with a container having supporting members on opposite end portions thereof intermediate the height of the container, and a bail member connected with the container for causing dumping thereof, of an upright frame adapted to be mounted on a motor vehicle, a carriage mounted on the upright frame, means connected with the carriage for raising and lowering the carriage relative to the upright frame, fork arms supported by the carriage and spaced apart a greater distance than the length of the container therebetween, said fork arms being in embracing relation with the container and supporting the container on the end supporting members, a shuttle mounted on the carriage, means connected with the shuttle for raising and lowering the shuttle relative to the carriage, a hook device on the shuttle in position for engaging the bail member to cause dumping action thereof, and means for locking the bail in the hook device in elevated position.

References Cited in the file of this patent

UNITED STATES PATENTS

| | | |
|---|---|---|
| 1,293,699 | Cannon | Feb. 11, 1919 |
| 1,410,991 | Cadwalader | Mar. 28, 1922 |
| 2,606,680 | Herman | Aug. 12, 1952 |
| 2,611,498 | Broersma | Sept. 23, 1952 |
| 2,633,259 | Dempster | Mar. 31, 1953 |
| 2,639,829 | Dempster et al. | May 26, 1953 |
| 2,676,722 | Ulinski | Apr. 27, 1954 |
| 2,678,742 | Zorn | May 18, 1954 |
| 2,678,743 | Backofen et al. | May 18, 1954 |
| 2,689,054 | Martin | Sept. 14, 1954 |
| 2,702,645 | Dempster et al. | Feb. 22, 1955 |
| 2,724,520 | Overbeck | Nov. 22, 1955 |
| 2,724,521 | Squires | Nov. 22, 1955 |
| 2,727,779 | Phillips | Dec. 20, 1955 |
| 2,741,382 | Shea et al. | Apr. 10, 1956 |
| 2,747,689 | Abbe | May 29, 1956 |
| 2,774,498 | Cordes et al. | Dec. 18, 1956 |
| 2,829,789 | Gerhardt et al. | Apr. 8, 1958 |